C. H. & J. H. McCALL.
Device to Protect Workmen from the Water while Washing Sheep.

No. 162,842. Patented May 4, 1875.

Attest:
B. Coventry
Israel Dayhuff

Inventor:
Charles H. McCall
James H. McCall
per R. S. & A. P. Lacey, attys

THE GRAPHIC CO.PHOTO-LITH.39 & 41 PARK PLACE,N.Y.

UNITED STATES PATENT OFFICE.

CHARLES H. McCALL AND JAMES H. McCALL, OF MORRISTOWN, OHIO.

IMPROVEMENT IN DEVICES TO PROTECT WORKMEN FROM THE WATER WHILE WASHING SHEEP.

Specification forming part of Letters Patent No. 162,842, dated May 4, 1875; application filed February 11, 1875.

*To all whom it may concern:*

Be it known that we, CHARLES H. McCALL and JAMES H. McCALL, of Morristown, in the county of Belmont and State of Ohio, have invented certain new and useful Improvements in a Device to Protect Workmen from the Water while Washing Sheep; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Our invention has for its object to provide a portable device to be used in washing sheep, whereby the workmen may have water entirely around them and be kept perfectly dry; that will prevent the water from being muddied by the stirring up of the bottom of the stream; that will provide easy means of exit for the sheep after being washed, and means for holding the sheep in the water.

It consists in one or more round or rectangular vessels or boxes, an inclined chute secured to an upright frame-work, and in a clasp attached to the vessels, the whole secured to and arranged upon a base-board, as hereinafter fully explained.

Figure 1:
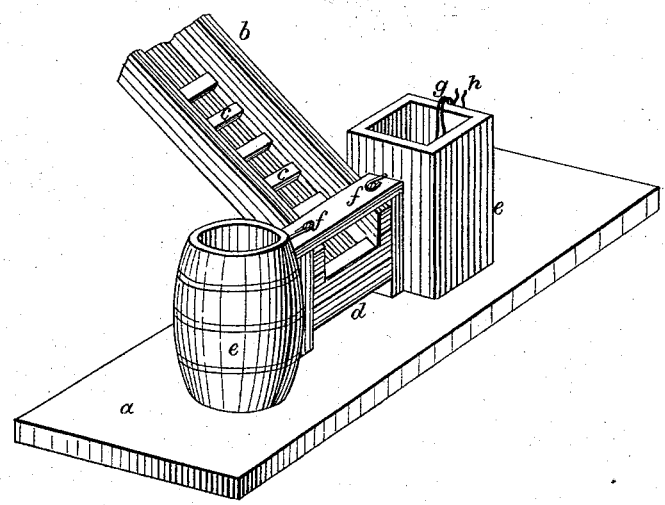
Figure 2:

Figure 1 is a perspective view of our device, and Fig. 2 a view of the clasp for holding the sheep.

*a* is a base-board of any suitable dimensions, and is provided with clevises, mortises, or eyes, through which to pass stakes or bolts for securing it to the bottom of the stream or washing-box. *b* is the exit-chute. It is provided with the cross-slats *c* on its bottom, to afford footing for the animals as they pass from the water. It is set at an upward incline, and is of sufficient length to reach to the shore or bank of the stream, or over the side of the washing-box to a proper landing. Its lower end is secured in the frame *d*, so that when the device is sunk in the stream the water will reach near to the top of the side-boards where joined to the frame. The upright posts of the frame *d* are bolted to the base-board *a* at or near the center of the latter. *e e* are the vessels or boxes in which the workmen stand. They are placed on the base-board so as to stand against the upright posts of the frame *d*, and so as not to obstruct the passage to the chute, and so that the workman may direct the sheep into the chute and hold the animal till it shall have attained a footing on the slats *c*. They are secured to the cross-beam on the posts by the rods or hooks *f*, and to the base-board by bolts passing through and packed in their bottoms; or they may be attached by any suitable means connected with the outer sides, and thus avoid the necessity of perforating the bottom for the bolt. They are made of such length as to reach above the water when the base-board is sunk to the proper depth. *g* is the clasp for holding the sheep. Its shank is made hook-shaped, and fits neatly over the side of the vessel. We sometimes make it with a ring on its inner lower end, which ring slides on a rod across or around the inner side of the vessel. The jaws *h* are constructed of spring metal, and so that they will clasp the neck of a sheep just behind the ears. It is movable, to enable the workman to secure a sheep out of his way on any side of the vessel.

The device may be used in a running stream or pond of water, or in a washing-box into which a stream of water is diverted. It is sunk in the stream, and firmly anchored to the bottom, or to trestles or supports previously properly anchored, so that the water will reach within a few inches of the top of the vessels. If placed in a washing-box it is bolted to the bottom thereof.

It will be seen that in using this device the workmen will have the water entirely around them; that they are kept dry except the hands; that by no means is the bottom of the stream stirred up, thereby making the water muddy; that when a sheep is washed the operator can hold it until it has reached a secure footing in the chute; and that the sheep can be held by the clasp or rest during the process of washing, or that one sheep may be secured and held near at hand, yet out of the way of the workman, while another is being washed, which is a desirable thing, as the wool can be rendered much cleaner by having it soaked a few minutes before the workman takes the sheep for final washing.

Having described our invention, what we claim, and desire to secure by Letters Patent, is—

The device herein described, composed of the platform *a*, vessels or inclosures *e e*, chute *b*, and frame *d*, constructed and arranged substantially as herein set forth, and for the purpose described.

In testimony that we claim the foregoing as our own we hereunto affix our signatures in presence of two witnesses.

CHARLES H. McCALL.
JAMES H. McCALL.

Witnesses:
C. H. KIRK,
J. A. STEWART.